US006823672B2

(12) United States Patent
Nakamura

(10) Patent No.: US 6,823,672 B2
(45) Date of Patent: Nov. 30, 2004

(54) CONTROL DEVICE FOR CONSTRUCTION MACHINE

(75) Inventor: Kazunori Nakamura, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 100 days.

(21) Appl. No.: 10/203,885

(22) PCT Filed: Dec. 17, 2001

(86) PCT No.: PCT/JP01/11045

§ 371 (c)(1),
(2), (4) Date: Aug. 15, 2002

(87) PCT Pub. No.: WO02/50435

PCT Pub. Date: Jun. 27, 2002

(65) Prior Publication Data

US 2003/0019681 A1 Jan. 30, 2003

(30) Foreign Application Priority Data

Dec. 18, 2000 (JP) ....................................... 2000-384003

(51) Int. Cl.$^{7}$ ................................................ F16D 31/02
(52) U.S. Cl. ............................................ 60/449; 60/452
(58) Field of Search .......................... 60/329, 422, 449, 60/452, 484, 486

(56) References Cited

U.S. PATENT DOCUMENTS 5,285,642 A * 2/1994 Watanabe et al. ............. 60/452
5,951,258 A * 9/1999 Lueschow et al. ............ 417/22
6,183,210 B1 * 2/2001 Nakamura ................... 60/431
6,202,014 B1 * 3/2001 Brandt et al. ................. 60/484
6,308,516 B1 * 10/2001 Kamada ...................... 60/452

FOREIGN PATENT DOCUMENTS

| | | |
|---|---|---|
| EP | 0277253 | 8/1988 |
| JP | 4-57685 | 5/1992 |
| JP | 05-312084 | 11/1993 |
| JP | 10-266881 | 10/1998 |
| WO | 02/50435 | 6/2002 |

* cited by examiner

*Primary Examiner*—Edward K. Look
*Assistant Examiner*—Igor Kershteyn
(74) *Attorney, Agent, or Firm*—Crowell & Moring LLP

(57) ABSTRACT

To provide a control system, which can realize a saving in energy and an improvement in the efficiency of work, for a construction machine having an engine, hydraulic pumps, pump regulators, a fuel injection system, hydraulic actuators, control valves including plural flow control valves, and control devices, a controller is constructed including an engine speed control for correcting an inputted reference target engine speed NRO to obtain a corrected target engine speed NROO, a pump absorption torque control for determining a target maximum pump absorption torque value TRO, and a first correcting system for correcting the corrected target engine speed NROO and the target maximum pump absorption torque value TRO into a new target engine speed NRO1 and a new target maximum pump absorption torque TR1, respectively, in accordance with a coolant temperature signal TH1 detected by a coolant temperature detector.

4 Claims, 9 Drawing Sheets

CONTROL DEVICE FOR CONSTRUCTION MACHINE

TECHNICAL FIELD

This invention relates to a control system for a construction machine such as a hydraulic excavator, said control system being provided with a controller for controlling an engine speed and a maximum pump absorption torque.

BACKGROUND ART

As a conventional technique of this type, there is one disclosed in JP-A-07119506. The control system according to this conventional technique is, for example, for a hydraulic excavator having an engine, a variable displacement hydraulic pump driven by the engine, a pump regulator for controlling a delivery rate of the hydraulic pump, a fuel injection system, i.e., governor for the engine, hydraulic actuators such as travel motors and an arm cylinder driven by pressure oil delivered from the hydraulic pump, flow control valves such as travel control valves and arm control valve for controlling flows of pressure oil to be supplied from the hydraulic pump to the hydraulic actuators, and control levers such as an arm lever for controlling these flow control valves, in other words, control devices. The control system is provided with a controller, which includes an engine speed control means for correcting an existing target engine speed in accordance with a stroke of the control lever to obtain a new target engine speed and a pump absorption torque controlling means for determining a target value of maximum pump absorption torque corresponding to the above-described new target engine speed.

This conventional technique detects a stroke of the control lever and a load on the hydraulic pump, and corrects a target engine speed in accordance with the stroke and load. Described specifically, the target engine speed is controlled to a lower target engine speed to achieve an energy saving when the stroke of the control lever is small and the load is low, and the target engine speed is controlled to a higher target engine speed to achieve an improvement in the efficiency of work when the stroke of the control lever is large and the load is high.

A construction machine such as the above-described hydraulic excavator is, however, accompanied by a potential problem that, when the construction machine is continuously operated under high loads or the construction machine is arranged in a high-temperature environment, the temperature of an engine coolant may rise to result in overheating and the work performed by the construction machine may have to be discontinued. In the above-described conventional technique, however, avoidance of such overheating was not taken into consideration.

With the above-described potential problem of the conventional technique in view, the present invention has as an object the provision of a control system for a construction machine, which can achieve a saving in energy and an improvement in the efficiency of work and can also avoid overheating.

DISCLOSURE OF THE INVENTION

To achieve the above-described object, the present invention provides in a first aspect thereof a control system for a construction machine provided with an engine, a variable displacement hydraulic pump driven by the engine, a pump regulator for controlling a delivery rate of the hydraulic pump, a fuel injection system for the engine, hydraulic actuators driven by pressure oil delivered from the hydraulic pump, flow control valves for controlling flows of pressure oil to be supplied from the hydraulic pump to the hydraulic actuators, and control devices for controlling the flow control valves, said control system being provided with a controller including an engine speed control means for correcting a reference target engine speed, which is inputted by an operator, in accordance with a controlled amount of at least one of the control devices to obtain a corrected target engine speed and a pump absorption torque control means for determining a target maximum pump absorption torque value corresponding to the corrected target engine speed, wherein the control system is provided with a coolant temperature detector for detecting a temperature of an engine coolant; and the controller comprises a first correcting means for correcting the corrected target engine speed, which has been obtained by the engine speed control means, and the target maximum pump absorption torque value, which has been computed by the pump absorption torque control means, into a new target engine speed and a new target maximum pump absorption torque, respectively, in accordance with the coolant temperature detected by the coolant temperature detector.

According to the invention of claim 1 constructed as described above, a rise in the temperature of the engine coolant as a result of continuous operation under high loads is detected by the coolant temperature detector. In accordance with the coolant temperature so detected, the first correction means corrects an existing corrected target engine speed into a new target engine speed within such a range that no overheating will be caused to occur, and at the same time, also corrects an existing target maximum pump absorption torque value into a new target maximum pump absorption torque commensurate with the new target engine speed.

By the above-described corrected target engine speed and target maximum pump absorption torque value, it is possible to achieve a saving in energy and an improvement in the efficiency of work as in the conventional technique, and moreover, it is also possible to surely avoid overheating in accordance with the above-described new target engine speed and target maximum pump absorption torque obtained by the first correction means.

The present invention, in a second aspect thereof, is characterized in that in the above-described first aspect of the present invention, the engine speed control means comprises a first correction value computing means for correcting the reference target engine speed in accordance with types of the hydraulic actuators and a computing means for determining the corrected target engine speed in accordance with the first correction value and the reference target engine speed; and the first correcting means comprises a second correction value computing means for determining a second correction value, which corrects the corrected target engine speed in accordance with a preset functional relation, based on the temperature of the coolant detected by the coolant temperature detector, a first engine speed computing means for determining a new target engine speed in accordance with the second correction value and the corrected target engine speed, a third correction value computing means for determining a third correction value, which corrects the target maximum pump absorption torque value in accordance with a preset functional relation, based on the coolant temperature detected by the coolant temperature detector, and a first torque computing means for determining a new target maximum pump absorption torque in accordance with the third correction value and the target maximum pump absorption torque value.

The present invention, in a third aspect thereof, is characterized in that in the above-described second aspect of the present invention, the engine speed control means comprises a fourth correction value computing means for determining a fourth correction value, which corrects the reference target engine speed, in accordance with operating directions of the hydraulic actuators; and the first engine speed computing means determines a still new target engine speed in accordance with the fourth correction value and the new target engine speed.

The present invention also provides in a fourth aspect thereof a control system for a construction machine provided with an engine, a variable displacement hydraulic pump driven by the engine, a pump regulator for controlling a delivery rate of the hydraulic pump, a fuel injection system for the engine, hydraulic actuators driven by pressure oil delivered from the hydraulic pump, flow control valves for controlling flows of pressure oil to be supplied from the hydraulic pump to the hydraulic actuators, and control devices for controlling the flow control valves, said control system being provided with a controller including an engine speed control means for correcting a reference target engine speed, which is inputted by an operator, in accordance with a controlled amount of at least one of the control devices to obtain a corrected target engine speed and a pump absorption torque control means for determining a target maximum pump absorption torque value corresponding to the corrected target engine speed, wherein:

the control system is provided with a working oil temperature detector; and the controller comprises a second correcting means for correcting the corrected target engine speed, which has been obtained by the engine speed control means, and the target maximum pump absorption torque value, which has been computed by the pump absorption torque control means, into a new target engine speed and a new target maximum pump absorption torque, respectively, in accordance with a working oil temperature detected by the working oil temperature detector.

According to the fourth aspect of the present invention constructed as described above, a rise in the temperature of working oil flowing through a hydraulic circuit of the construction machine as a result of continuous operation under high loads is detected by the working oil temperature detector. In accordance with the working oil temperature so detected, the second correction means corrects an existing corrected target engine speed into a new target engine speed within such a range that no overheating will be caused to occur, and at the same time, also corrects an existing target maximum pump absorption torque value into a new target maximum pump absorption torque commensurate with the new target engine speed.

By the above-described corrected target engine speed and target maximum pump absorption torque value, it is possible to achieve a saving in energy and an improvement in the efficiency of work as in the conventional technique, and moreover, it is also possible to surely avoid overheating in accordance with the above-described new target engine speed and target maximum pump absorption torque obtained by the second correction means.

The present invention, in a fifth aspect thereof, is characterized in that in the above-described fourth aspect of the present invention, the engine speed control means comprises a first correction value computing means for correcting the reference target engine speed in accordance with types of the hydraulic actuators and a computing means for determining the corrected target engine speed in accordance with the first correction value and the reference target engine speed; and the second correcting means comprises a fifth correction value computing means for determining a fifth correction value, which corrects the corrected target engine speed in accordance with a preset functional relation, based on the working oil temperature detected by the working oil temperature detector, a second engine speed computing means for determining a new target engine speed in accordance with the fifth correction value and the corrected target engine speed, a sixth correction value computing means for determining a sixth correction value, which corrects the target maximum pump absorption torque value in accordance with a preset functional relation, based on the working oil temperature detected by the working oil temperature detector, and a second torque computing means for determining a new target maximum pump absorption torque in accordance with the sixth correction value and the target maximum pump absorption torque value.

The present invention, in a sixth aspect thereof, is characterized in that in the above-described fifth aspect of the present invention, the engine speed control means comprises a fourth correction value computing means for determining a fourth correction value, which corrects the reference target engine speed, in accordance with operating directions of the hydraulic actuators; and the second engine speed computing means for determining a still new target engine speed in accordance with the fourth correction value and the new target engine speed.

The present invention, in a seventh aspect of thereof, is characterized in that in any one of the above-described first to sixth aspects of the present invention, the construction machine is a hydraulic excavator.

BEST MODE FOR CARRYING OUT THE INVENTION

The embodiments of the control system according to the present invention for the construction machine will hereinafter be described based on the diagrams.

Figure 1:
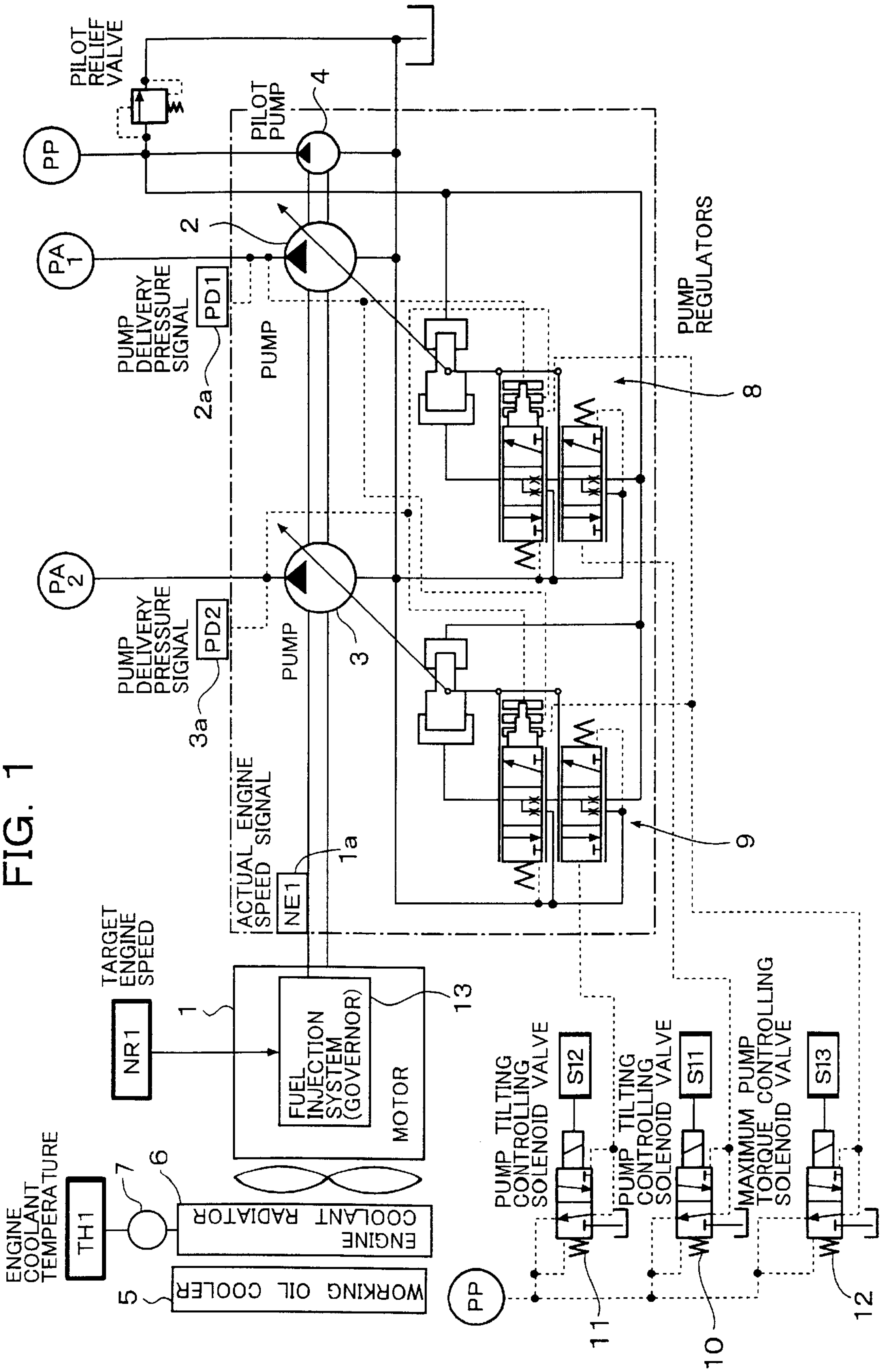
FIG. 1 is a diagram showing a drive mechanism of a construction machine equipped with a first embodiment of the present invention.
Figure 2:
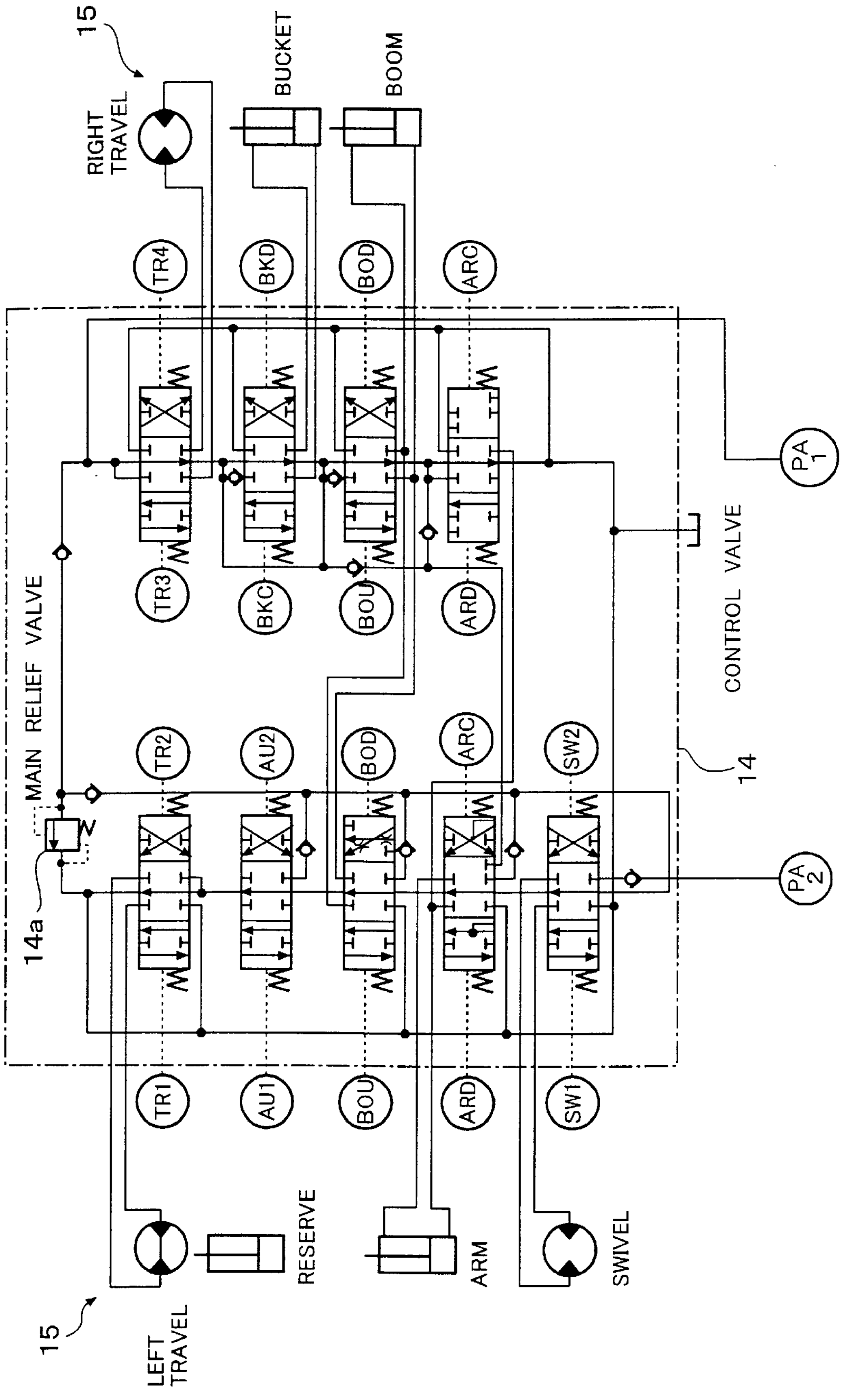
FIG. 2 is a diagram illustrating an essential part of a hydraulic actuator drive circuit of the construction machine equipped with the first embodiment of the present invention.

FIG. 1 is the diagram showing the drive mechanism of the construction machine equipped with the first embodiment of the present invention; FIG. 2 is the diagram illustrating the essential part of the hydraulic actuator drive circuit of the construction machine equipped with the first embodiment of the present invention; and FIG. 3 is the diagram depicting the control devices which are arranged on the construction machine equipped with the first embodiment of the present invention.

Figure 3:
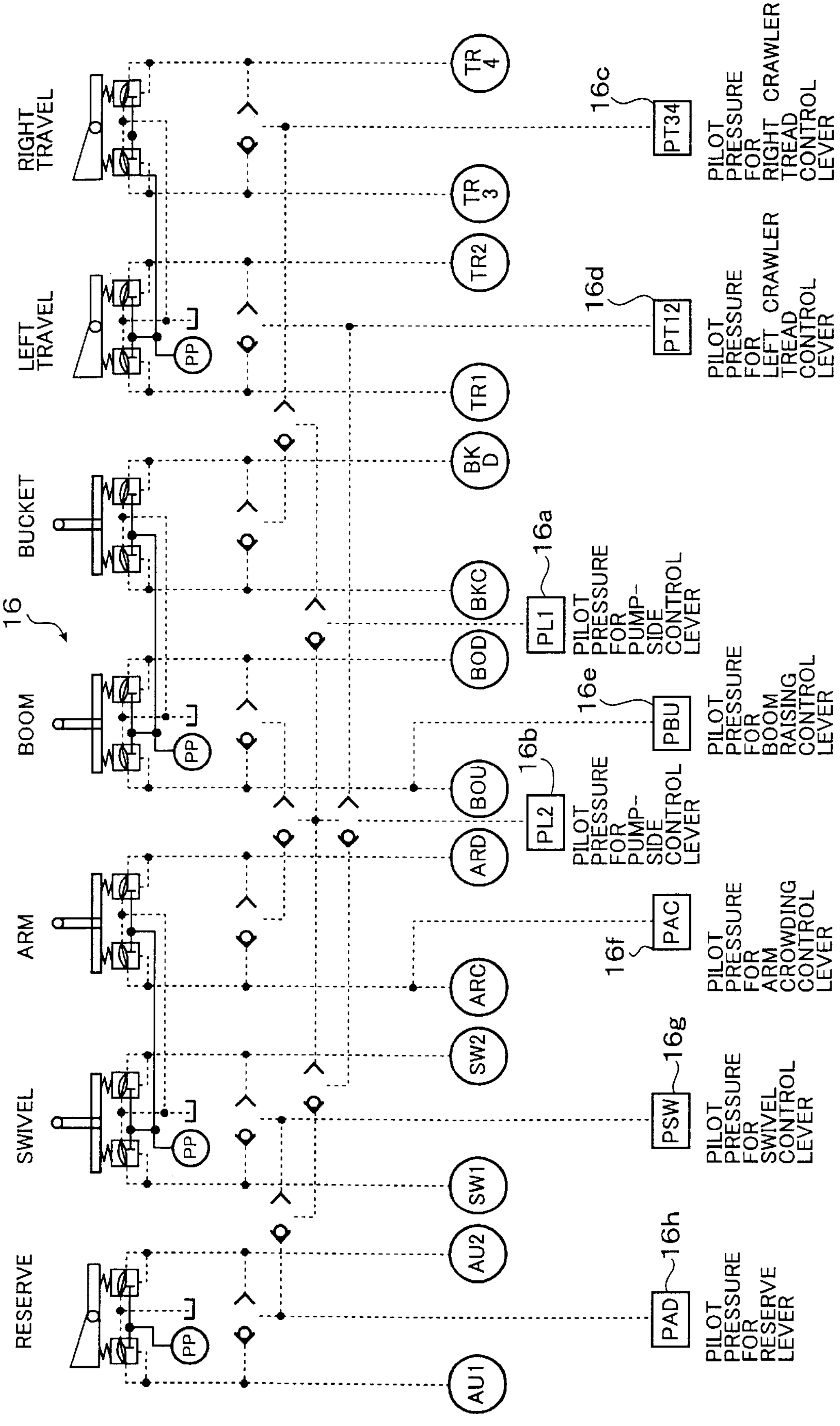
FIG. 3 is a diagram depicting control devices which are arranged on the construction machine equipped with the first embodiment of the present invention.

Based on FIGS. 1 to 3, a description will firstly be made about the outline construction of the construction machine, for example, a hydraulic excavator equipped with the first embodiment of the present invention.

The hydraulic excavator which is provided with the first embodiment is equipped with a motor, i.e., an engine 1 and a first hydraulic pump 2, second hydraulic pump and pilot pump 4 all of which are of the variable displacement type and are driven by the engine 1.

The hydraulic pumps 2,3 are controlled in delivery rate by pump regulators 8,9, respectively. These pump regulators 8,9 are in turn controlled by solenoid operated valves 10,11, respectively. A total maximum pump absorption torque of the hydraulic pumps 2,3 is controlled by a solenoid operated valve 12. Namely, overall power control is performed. These solenoid operated valves 10,11,12 are driven by their corresponding drive currents S11,S12,S13 to be described subsequently herein.

Speed control of the engine 1 is performed by a fuel injection system 13. The fuel injection system 13 has a governor function, and is driven under control by a target engine speed signal NR1 outputted from a controller 17 which will be described subsequently herein. As the governor type of the fuel injection system 13, it can be either an electronic governor operated by electric inputs or a mechanical governor to which engine speed commands are inputted by driving a governor lever with a motor.

Also arranged are a working oil cooler 5 for cooling working oil flowing through a hydraulic circuit, which the hydraulic excavator is provided with, and a radiator 6 for cooling an engine coolant. These working oil cooler 5 and radiator 6 are air-cooled by a fan of the engine 1. For example, the radiator 6 is provided with a coolant temperature detector 7, which detects a temperature of the coolant and outputs an engine coolant temperature signal TH1.

As shown in FIG. 1, there are also arranged an actual engine speed detector 1*a* for detecting an actual engine speed of the engine 1 and outputting an actual engine speed signal NE1, a pump delivery pressure detector 2*a* for detecting a delivery pressure PA1 of the first hydraulic pump 2 and outputting a pump delivery pressure signal PD1, and a pump delivery pressure detector 3*a* for detecting a delivery pressure PA2 of the second hydraulic pump 3 and outputting a pump delivery pressure signal PD2.

As illustrated in FIG. 2, the above-described delivery pressures PA1, PA2 of the hydraulic pumps 2,3 are fed to hydraulic actuators 15 via control valves 14 in which plural flow control valves are included. Examples of the flow control valves included in the control valves 14 communicated to the first hydraulic pump 2 can include a flow control valve for a right crawler tread, a flow control valve for a bucket, a flow control valve for a boom and a flow control valve for an arm, while examples of the flow control valves included in the control valves 14 communicated to the second hydraulic pump 3 can include a flow control valve for a swivel superstructure, a flow control valve for the arm, a flow control valve for the boom, a flow control valve for a reserve actuator and a flow control valve for a left crawler tread. Illustrative of the hydraulic actuators 15 are a travel motor for driving one of the crawler treads of a travel base, for example, a right travel motor, a bucket cylinder for driving the bucket, a boom cylinder for driving the boom, a swivel motor for driving the swivel superstructure, an arm cylinder for driving the arm, the reserve actuator for driving a special attachment such as a breaker, and a travel motor for driving the other crawler tread, i.e., a left travel motor. Incidentally, the control valves 14 also include a main relief valve 14*a* which specifies maximum values of delivery pressures of the hydraulic pumps 2,3.

As shown in FIG. 3, this hydraulic excavator is provided with control devices 16 for controlling the above-described respective hydraulic actuators illustrated in FIG. 2. These control devices 16 include a control lever for the right crawler tread, a control lever for the left crawler tread, a control lever for the bucket, a control lever for the boom, a control lever for the arm, a control level for the swivel superstructure, a control lever for the reserve actuator, and the like.

In association with the above-described control devices 16, pressure detectors 16*a*–16*h* are arranged. Described specifically, there are arranged, as illustrated in FIG. 3, a pressure detector 16*a* for detecting a maximum value of a pilot pressure from the control lever for the hydraulic actuator 15 communicated to the first hydraulic pump 2 and outputting a signal PL1, a pressure detector 16*b* for detecting a maximum value of a pilot pressure from the control lever for the hydraulic actuator 15 communicated to the second hydraulic pump and outputting a signal PL2, a pressure detector 16*c* for detecting a pilot pressure outputted upon operation of the control lever for the right crawler tread and outputting a signal PT34, a pressure detector 16*d* for detecting a pilot pressure outputted upon operation of the control lever for the left crawler tread and outputting a signal PT12, a pressure detector 16*e* for detecting a pilot pressure upon operation of the control lever for the boom in a boom raising direction and outputting a signal PBU, a pressure detector 16*f* for detecting a pilot pressure upon operation of the control lever for the arm in an arm crowding direction and outputting a signal PAC, a pressure detector 16*g* for detecting a pilot pressure outputted upon operation of the control lever for the swivel superstructure and outputting a signal PSW, and a pressure detector 16*h* for detecting a pilot pressure outputted upon operation of the control lever for the reserve actuator and outputting a signal PAD.

Figure 4:
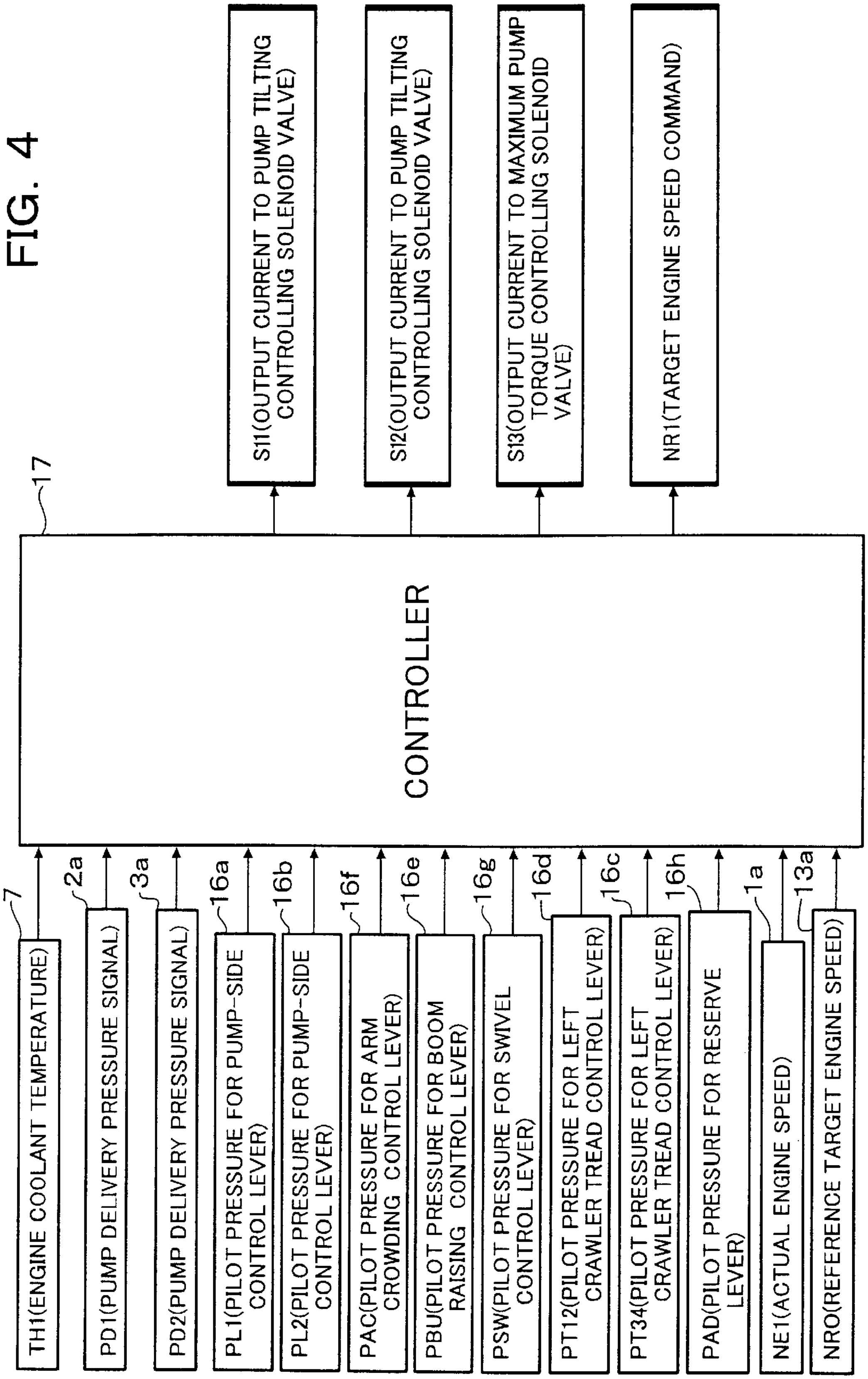
FIG. 4 is a diagram showing relations between input signals and output signals at a controller which constitutes the first embodiment of the present invention.

As depicted in FIG. 4, the above-described pressure detectors 16*a*–16*h*, the actual engine speed detector 1*a*, the pump delivery pressure detectors 2*a*,3*a* and the coolant temperature detector 7 are arranged, for example, in an unillustrated cab of the swivel superstructure (not shown), and are connected to the controller 17 which constitutes the control system according to this first embodiment.

Also arranged is, as shown in FIG. 4, an engine speed input device 13*a* which is operated by an operator to output a reference target engine speed signal NRO. This engine speed input device 13*a* is also connected to the controller 17. This engine speed input device 13*a* includes, for example, a potentiometer and allows the operator, namely, the operator himself of the hydraulic excavator to selectively set the engine speed at a desired level by manual operation. A high engine speed is selected upon performing digging work of earth, sand, stones, rocks and/or the like, while a low engine speed is selected upon performing grading work of the ground or like work.

As a result of arithmetic processing, which is to be described subsequently herein, at the controller 17, there are outputted, as shown in FIG. 4, signals S11,S12,S13 for driving the above-described solenoid operated valves 10,11, 12 shown in FIG. 1 and also, a target engine speed signal NR1 for driving the fuel injection system 13.

Figure 5:
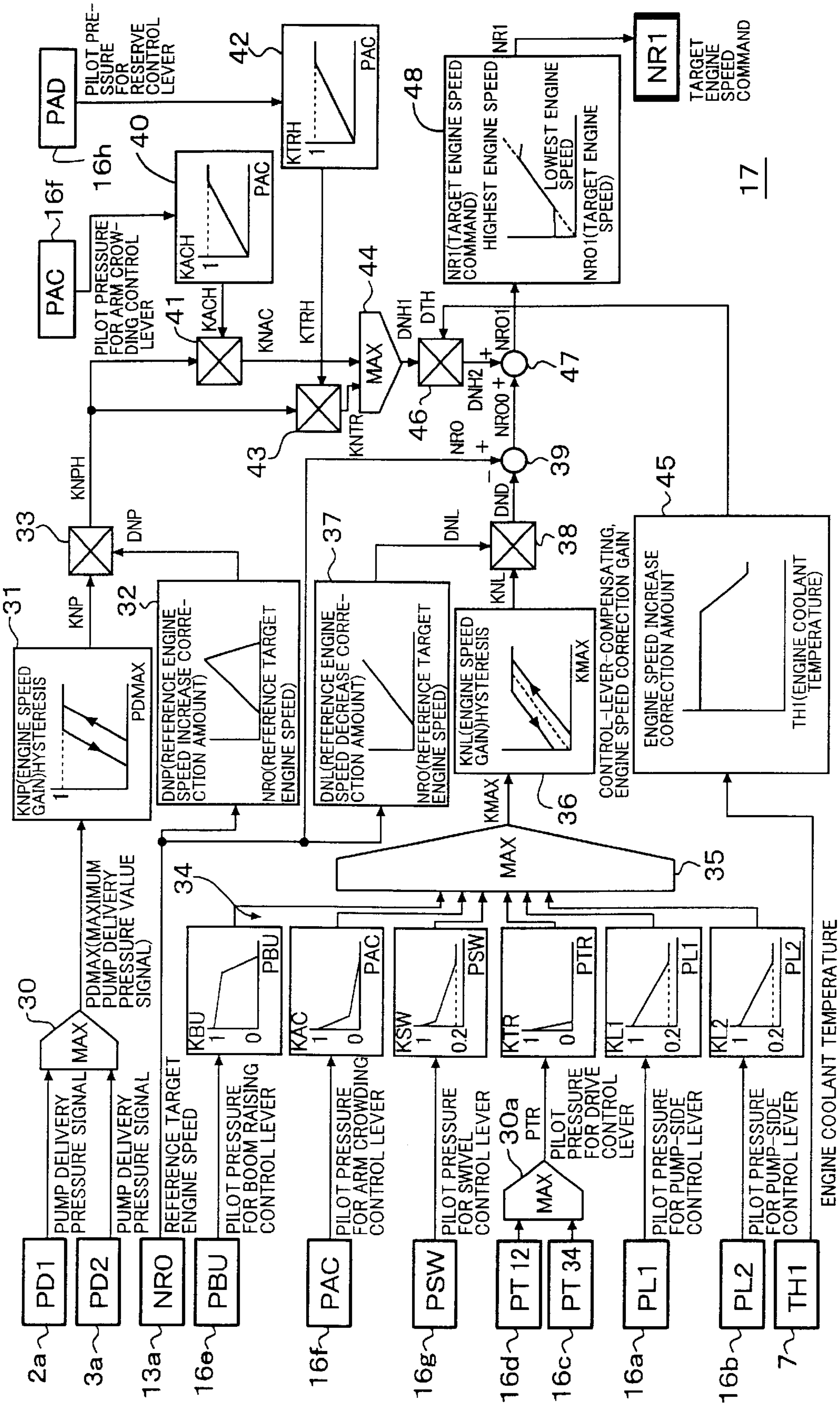
FIG. 5 is a diagram illustrating an engine speed control means, which includes a first correction value computing means and a fourth correction value computing means, and a second correction value computing means and a first engine speed computing means both of which are included in a first correction means, all of which are arranged in the controller constituting the first embodiment of the present invention.
Figure 6:
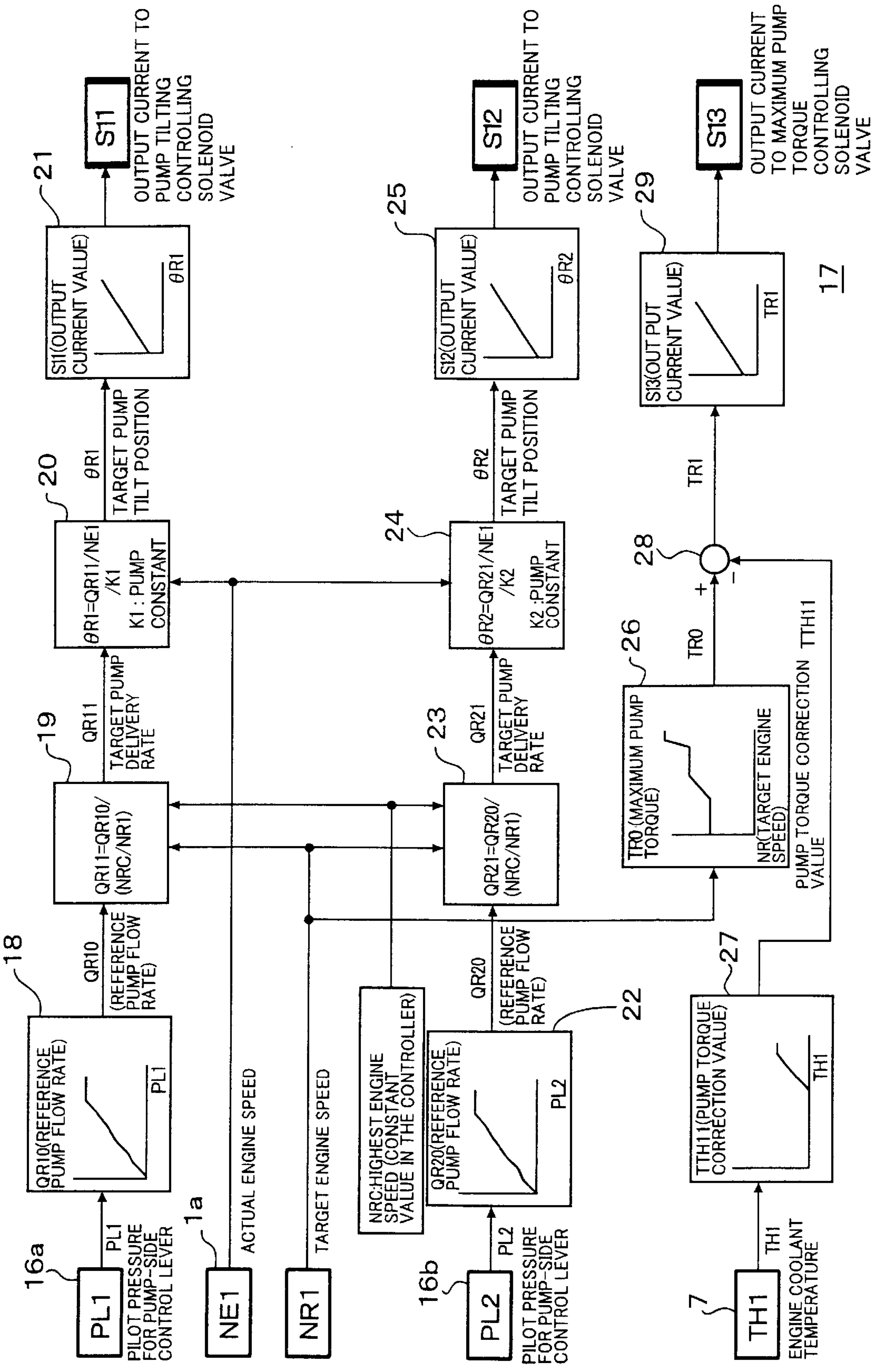
FIG. 6 is a diagram depicting a pump absorption torque control means, and a third correction value computing means and a first torque computing means both of which are included in the first correction means, all of which are arranged in the controller constituting the first embodiment of the present invention.

With reference to FIGS. 5 and 6, a description will next be made about the controller 17 which constitutes the control system according to the first embodiment.

FIG. 5 is the diagram illustrating the engine speed control means, which includes the first correction value computing means and the fourth correction value computing means, and the second correction value computing means and the first engine speed computing means both of which are included in the first correction means, all of which are arranged in the controller constituting the first embodiment of the present invention; and FIG. 6 is the diagram depicting the pump absorption torque control means, and the third correction value computing means and the first torque computing means both of which are included in the first correction means, all of which are arranged in the controller constituting the first embodiment of the present invention.

The controller 17 is provided with a computing means 32 for determining a reference engine speed increase correction amount DNP and a computing means 37 for determining a reference engine speed decrease correction amount DNL, both in accordance with a reference target engine speed signal NRO outputted from the engine speed input device 13*a*. The reference engine speed increase correction amount DNP serves as a reference width of engine speed corrections for changes in inputs of delivery pressures PA1, PA2 of the hydraulic pumps 2,3, and is set to become a smaller value as the reference target engine speed becomes lower than a predetermined value. The reference engine speed decrease correction amount DNL, on the other hand, serves as a reference width of engine speed for changes in inputs by the control lever as the control device 16, and is set to become a smaller value as the reference target engine speed becomes lower.

Also arranged are computing means 34 for computing engine speed correction gains specific to the respective hydraulic actuators 15, namely, first correction values KBU, KAC, KSW, KTR, KL1 and KL2 in correspondence to signals PBU, PAC, PSW, PT12, PT34, PL1 and PL2 outputted from the respective pressure detectors 16*e*,16*f*,16*g*, 16*d*,16*c*,16*a*,16*b* shown in FIG. 3. Concerning the signals PT12,PT34 outputted from the travel-related pressure detectors 16*d*,16*c* among the above-described pressure detectors, a maximum value of these signals is selected by a maximum value selecting means 30*a*, and corresponding to a selected signal PTR, an engine speed correction gain KTR is determined.

The above-described computing means 34 make up the first correction value computing means for determining the first correction values KBU,KAC,KSW,KTR,KL1,KL2 which correct the reference target engine speed signal NRO depending upon the types of the hydraulic actuators 15.

Also arranged are a maximum value selecting means 35 for selecting a maximum value out of the first correction values KBU,KAC,KSW,KTR,KL1,KL2 determined by the computing means 34 and outputting a signal KMAX, a computing means 36 having a hysteresis capable of preventing instability in control due to slight movements of the control levers and outputting an engine speed gain KNL corresponding to the signal KMAX outputted from the maximum value selecting means 35, a multiplier 38 for multiplying together the gain KNL outputted from the computing means 36 and the above-described signal DNL outputted from the computing means 37, and a subtracter 39 for subtracting the above-described output of the multiplier 38, i.e., the correction amount DND from the output of the engine speed input device 13*a*, i.e., the reference target engine speed signal NRO to determine a target value of a corrected engine speed after operation of one or more of the control levers, that is, a corrected target engine speed NROO.

The above-described subtracter 39 constitutes a computing means for determining the corrected target engine speed NROO on the basis of the above-described first correction values KBU,KAC,KSW,KTR,KL1,KL2 and reference target engine speed signal NRO.

Arranged further are a maximum value selecting means 30 for selecting a signal of greater value out of the signal PD1 outputted from the pump delivery pressure detector 2*a* and the signal PD2 outputted from the pump delivery pressure detector 3*a* and outputting a signal PDMAX, a computing means 31 having a hysteresis capable of preventing instability in control due to slight fluctuations in delivery pressures and outputting an engine speed gain KNP corresponding to the signal PDMAX outputted from the maximum value selecting means 30, and a multiplier 33 for multiplying together the signal DNP relating to the above-described reference engine speed increase correction amount outputted from the computing means 32 and a signal KNP relating to the above-described engine speed gain outputted from the computing means 37 and outputting a signal KNPH.

Also arranged are a fourth correction value computing means 40 for obtaining a value of 1 or smaller as a correction gain, namely, as a fourth correction value KACH in proportion to a pilot pressure from the arm crowding control lever as outputted from the pressure detector 16*f* and outputting the same, and a computing means 42 for obtaining a value of 1 or smaller as a correction gain KTRH in proportion to a pilot pressure from the control lever for the reserve actuator as outputted from the pressure detector 16*h* and outputting the same.

The above-described pressure detector 16*f* serves to detect an operated direction of the arm cylinder for performing arm crowding out of arm operations. Accordingly, the above-described fourth correction value computing means 40 constitutes the computing means for obtaining the fourth correction value KACH which corrects the above-described reference target engine speed signal NRO depending upon the direction of operation of the arm cylinder.

There are also arranged a multiplier 41 for multiplying together the fourth correction value KACH outputted from the fourth correction value computing means 40 and the above-described signal KNPH outputted from the computing means 33 and outputting a signal KNAC, a multiplier 43 for multiplying together the correction gain KTRH for the reserve control lever as outputted from the computing means 42 and outputting a signal KNTR, and a maximum value selecting means 44 for selecting one of a greater value from the signal KNAC outputted from the multiplier 41 and the signal KNTR outputted from the multiplier 43 and outputting a signal DNH1.

The above-described maximum value selecting means 30,30*a*,35,44, the computing means 31,32,36,37,42, the multipliers 33,38,41,43, the subtracter 39, the first correction value computing means 34 and the fourth correction value computing means 40 constitute the engine speed control means which corrects the reference target engine speed NRO, which has been inputted by the operator, by operation of one or more of the control devices to obtain the corrected target engine speed.

This first embodiment is equipped particularly with a second correction value computing means 45 for determining a second correction value DTH, which corrects the extent of an increase in the corrected target engine speed, on the basis of the engine coolant temperature signal TH1 detected by the coolant temperature detector 7, in accordance with a functional relation preset with a view to avoiding overheating of the engine 1. As illustrated in FIG. 5, the second correction value computing means 45 outputs a constant value as the second correction value DTH until the engine coolant temperature reaches a predetermined temperature, and as the engine coolant temperature rises beyond the predetermined temperature, outputs as the second correction value DTH a value which becomes gradually smaller.

Arranged further are a multiplier 46 for multiplying together the above-described signal DNH1 outputted from the maximum value selecting means 44 and the above-described second correction value DTH outputted from the second correction value computing means 45 and outputting a signal DNH2, and an adder 47 for performing an arithmetic operation such that the signal DNH2 outputted from the amplifier 46 and the above-described signal NROO outputted from the subtracter 39 are added together to obtain a signal NRO1.

This adder 47 constitutes the first engine speed computing means which determines a new target engine speed on the basis of the second correction value DTH outputted from the second correction value computing means 45 and the above-described corrected target engine speed computed by the engine speed control means.

Also arranged is a computing means 48, which determines a target engine speed NR1 on the basis of the signal NRO1 outputted from the adder 47 while applying a limiter as a value within a range of from a lowest engine speed to a highest engine speed as determined by the construction of the drive mechanism of the engine 1. The target engine speed NR1 outputted from the computing means 48 is fed to the fuel injection system 13 and is also used f or controlling the f low rates and maximum absorption torques of the pumps as will be described subsequently herein. The fuel injection system 13 is operated to adjust the fuel injection rate such that an engine speed commensurate with the target engine speed NR1 is obtained.

As shown in FIG. 6, the controller 17 is provided with a computing means 18 for determining a reference flow rate metering for positive control, namely, a reference pump flow rate QR10 on the basis of a signal outputted from the pressure detector 16*a* arranged to detect a maximum value of pilot pressure upon operation of the control lever as the control device 16 for the hydraulic actuator 15 communicated to the first hydraulic pump 2, a computing means 19 for multiplying together the ratio of the above-described target engine speed NR1 outputted from the computing means 48 shown in FIG. 5 to the maximum engine speed NRC preset in the controller 17 and the above-described reference pump flow rate QR10 outputted from the computing means 18 and outputting a target pump delivery rate QR11, a computing means 20 for performing an arithmetic operation to obtain a target pump tilt position QR1 by dividing the target pump delivery rate QR11 detected from the computing means 19 with the actual engine speed NE1 outputted from the actual engine speed detector 1*a* and further dividing the quotient with a preset pump constant K1, and a computing means 21 for determining an output current value signal S11 corresponding to the target pump tilt position QR1 outputted from the computing means 20. The output current value signal S11 outputted from the computing means 21 is fed to the solenoid operated valve 10 which drives the pump regulator 8 arranged to control the delivery flow rate of the first hydraulic pump 2 illustrated in FIG. 1.

Likewise, the controller is also provided with a computing means 22 for determining a reference flow rate metering for positive control, namely, a reference pump flow rate QR20 on the basis of a signal outputted from the pressure detector 16*b* arranged to detect a maximum value of pilot pressure upon operation of the control lever as the control device 16 for the hydraulic actuator 15 communicated to the second hydraulic pump 3, a computing means 23 for multiplying together the ratio of the above-described target engine speed NR1 outputted from the computing means 48 shown in FIG. 5 to the maximum engine speed NRC preset in the controller 17 and the above-described reference pump flow rate QR20 outputted from the computing means 22 and outputting a target pump delivery rate QR21, a computing means 24 for performing an arithmetic operation to obtain a target pump tilt position QR2 by dividing the target pump delivery rate QR21 outputted from the computing means 23 with the actual engine speed NE1 outputted from the actual engine speed detector 1*a* and further dividing the quotient with a preset pump constant K2, and a computing means 25 for determining an output current value signal S12 corresponding to the target pump tilt position QR2 outputted from the computing means 24. The output current value signal S12 outputted from the computing means 25 is fed to the solenoid operated valve 11 which drives the pump regulator 9 arranged to control the delivery flow rate of the second hydraulic pump 3 illustrated in FIG. 1.

Arranged further are a pump absorption torque control means 26 for performing an arithmetic operation to determine a maximum total absorption torque of the pumps 2,3, said maximum total absorption torque corresponding to the target engine speed NR1 outputted from the computing means 48 shown in FIG. 5, namely, a target maximum pump absorption torque value TRO, a third correction value computing means 27 for determining a third correction value TTH11, which corrects the above-described target maximum pump absorption torque value TRO, on the basis of the coolant temperature signal TH1 detected by the coolant temperature detector 7, in accordance with a functional relation preset with a view to avoiding overheating of the engine 1, and a subtracter 28 for subtracting the third correction value TTH11 from the above-described target maximum pump absorption torque value TRO. This substracter 28 constitutes the first torque computing means for determining a new target maximum pump absorption torque TR1 on the basis of the third correction value TTH11 and the above-described target maximum pump absorption torque value TRO.

There is also arranged a computing means 29 for determining an output current value signal S13 on the basis of the target maximum pump absorption torque TR1 outputted from the subtracter 28. The output current value signal S13 outputted from the computing means 29 is fed to the solenoid operated valve 12 shown in FIG. 1.

Among the above-described individual elements of structure, the second correction value computing means 45 and the adder 47 making up the first engine speed computing means, both of which are illustrated in FIG. 5, and the third correction value computing means 27 and the subtracter 28 making up the first torque computing means, both of which are depicted in FIG. 6, constitute the first correction means for correcting the above-described target corrected target engine speed determined by the engine speed control means and the target maximum pump absorption torque value TRO computed by the pump absorption torque control means 26 into the new target engine speed NRO1 and the new target maximum pump absorption torque TR1, respectively, in accordance with the coolant temperature signal TH1 detected by the coolant temperature detector 7.

In the first embodiment constituted as described above, when upon performing, for example, digging work or the like of earth and/or sand, the engine speed input device 13*a* is operated to set the reference target engine speed NRO at a high level and the control lever for the boom is operated in the boom raising direction, a signal PBU is outputted from the pressure detector 16*e* and at the first correction value computing means 34, a first correction value KBU corresponding to the signal PBU is outputted. This first correction value KBU is selected as a signal KMAX at the maximum value selecting means 35, and then, this signal KMAX is outputted as an engine speed gain KNL, which is thereafter inputted to the multiplier 38. On the other hand, a reference engine speed decrease amount DNL corresponding to the above-described reference target engine speed NRO is determined at the computing means 37, and this DNL is inputted to the multiplier 38. At the multiplier 38, KNL and DNL are multiplied together and are outputted as DND. This DND is inputted to the subtracter 39. At this subtracter 39, DND is subtracted from the reference target engine speed NRO to obtain a corrected target engine speed NROO. This NROO is then inputted to the adder 47.

On the other hand, the greater one of pump delivery pressure signals PD1,PD2 outputted from the pump delivery pressure detectors 2*a*, 3*a* is selected at the maximum value selecting means 30, and an engine speed gain KNP corresponding to the thus-selected maximum pump delivery pressure value signal PDMAX is determined at the computing means 31 and is inputted to the multiplier 33. A reference engine speed increase correction amount DNP corresponding to the reference target engine speed NRO is determined at the computing means 32, and this DNP is inputted to the multiplier 33. At the multiplier 33, KNP and DNP are multiplied together and are outputted as KNPH. This KNPH is inputted to the multiplier 43 and is then outputted as KNTR. At the maximum value selecting means 44, DNH1 is outputted and is then inputted to multiplier 46.

Now assume that work during which high loads are applied is performed for a short time, the working oil temperature does not rise substantially, and accordingly, the coolant temperature signal TH1 detected at the coolant temperature detector 7 does not become substantially high. An engine speed increase correction amount which is a constant value, namely, a second correction value DTH1 is selected at the second correction value computing means 45 and is inputted to the multiplier 46. At the multiplier 46, DNH1 and a second correction value DTH are multiplied together, and the thus-obtained DNH2 is inputted to the adder 47. At the adder 47, a corrected target engine speed NROO and DNH2 are added together, and the thus-obtained NRO1 is outputted. This NRO1 is a value which is not subjected to any correction in accordance with a coolant temperature. A relatively high target engine speed NR1 corresponding to NRO1 is determined at the computing means 48, and as mentioned above, this target engine speed NR1 is outputted to the fuel injection system 13 shown in FIG. 1. In addition, the target engine speed NR1 is also used for controlling the delivery rates and maximum absorption torques of the pumps.

The fuel injection system 13 drives the engine 1 to obtain an engine speed commensurate with the target engine speed NR1. An actual engine speed of the engine 1 is detected at the actual engine speed detector 1*a*.

Corresponding to the actual engine speed of the engine 1, the hydraulic pumps 2,3 and the pilot pump 4 are driven.

Responsive to operation of the control lever for the boom in the boom raising direction, pump-side control lever pilot pressures PL1,PL2 are outputted from the pressure detectors 16*a*, 16*b*, reference pump flow rates QR10,QR20 are determined at the computing means 18,22, respectively, target pump delivery rates QR11,QR21 are determined at the computing means 19,23, respectively, and target pump tilt positions QR1,QR2 are determined at the computing means 20,24, respectively. Output current value signals S11,S12 corresponding to these QR1,AR2 are determined at the computing means 21,25, and these output current value signals S11,S12 are fed to the solenoid operated valves 10,11 illustrated in FIG. 1. By these output current value signals, the solenoid operated valves 10,11 are driven. Responsive to these signals, the pump regulators 8,9 are operated to control the tilted positions of the hydraulic pumps 2,3.

Responsive to the above-described operation of the control lever for the boom in the boom raising direction, the two flow control valves for the boom, which are included in the control valves 14 shown in FIG. 2, are changed over to the left positions as viewed in the drawing, so that delivery pressures PA1, PA2 from the hydraulic pumps 2,3 are fed to the boom cylinder via the above-described respective flow control valves for the boom. As a result, the boom is caused to extend such that the desired boom raising operation is performed.

At this time, a target maximum pump absorption torque value TRO corresponding to the target engine speed NR1 is determined at the pump absorption torque control means 26 and is inputted to the subtracter 28, as illustrated in FIG. 6.

As the high-load work has been performed for the short time and the working oil temperature has not risen substantially, the coolant temperature signal TH1 has not become substantially high. Therefore, the third correction value TTH11 determined at the third correction value computing means 27 shown in FIG. 6 is "0", and this "0" is inputted to the subtracter 28. A signal TR1 equal in value to the target maximum pump absorption torque value TRO is, therefore, outputted from the subtracter 28. An output current value signal S13 corresponding to this TR1 is outputted from the computing means 29, and is fed to the solenoid operated valve 12. As a result, the solenoid operated valve 12 is driven to perform overall power control such that the total maximum absorption torque of the hydraulic pumps 2,3 does not exceed the output torque of the engine 1.

As the stroke of the control lever for the boom is rendered smaller in the above-described work, the value of the first correction value KBU corresponding to the signal PBU from the first correction value computing means 34 shown in FIG. 5 becomes greater, and as a result, the value of the corrected target engine speed NROO outputted from the subtracter 39 becomes smaller so that the target engine speed NR1 outputted from the computing means 48 becomes lower compared with the existing target engine speed. As a consequence, the target maximum pump absorption torque value TRO determined at the pump absorption torque control means 26 illustrated in FIG. 6 also becomes smaller than the existing target maximum pump absorption torque value.

When, for example, work during which high loads are applied is performed for a short time, the working oil temperature does not rise substantially, and the coolant temperature does not become substantially high as mentioned above, the target engine speed NR1 becomes high and the target maximum pump absorption torque value TRO (TR1) becomes greater, thereby making it possible to achieve an improvement in the efficiency of work. When from the above-described situation, the stroke of the control lever becomes smaller and the load becomes lower, for example, the target engine speed NR1 becomes lower and the target maximum pump absorption torque value TRO (TR1) becomes smaller, thereby making it possible to achieve a saving in energy.

When, for example, work which is performed by setting high the reference target engine speed NRO and operating the control lever for the boom in the boom raising direction, that is, work during which high loads are applied as mentioned above is continued for a long time or the temperature of the working environment becomes higher and as a result, the working oil temperature rises and the coolant temperature signal TH1 hence becomes higher than a predetermined temperature, on the other hand, the second correction value DTH1 determined at the second correction value computing means 45 shown in FIG. 5 becomes smaller than the existing second correction value, and as a consequence, the value of the signal DNH2 outputted from the multiplier 46 becomes smaller so that the value of the target engine speed NRO1 determined at the adder 47 also becomes smaller. Namely, the corrected target engine speed NROO(NRO1) is corrected such that it becomes smaller than the existing value, and accordingly, a new target engine speed NRO1 is obtained.

As a consequence, the target engine speed NR1 outputted from the computing means 48 also becomes lower, and by the fuel injection system 13 depicted in FIG. 1, the actual engine speed NE1 is lowered to an engine speed within a range in which no overheating takes place.

As a result of the reduction in the target engine speed NR1 as mentioned above, the target maximum pump absorption torque value TRO outputted from the pump absorption torque control means 26 becomes smaller, the value of the third correction value TTH11 determined at the third correction value computing means 27 shown in FIG. 6 becomes greater, and the value of TR1 determined at the subtracter 28 becomes smaller. Therefore, the output current value signal S13 determined at the computing means 29 becomes a smaller value. As a consequence, the regulator 12 is controlled such that the total maximum absorption torque of the hydraulic pumps 2,3 becomes smaller than the existing total maximum absorption torque.

For the sake of simplification of the description, the above description was made about the operation when the control lever for the boom, out of the control devices 16, was operated in the boom raising direction. Operation is also performed in substantially the same manner as in the above when the other hydraulic actuators are operated either singly or in combination.

According to the first embodiment constructed as described above, it is possible to achieve a saving in energy and an improvement in the efficiency of work and also to avoid overheating and thus, discontinuation of work due to overheating.

Figure 7:
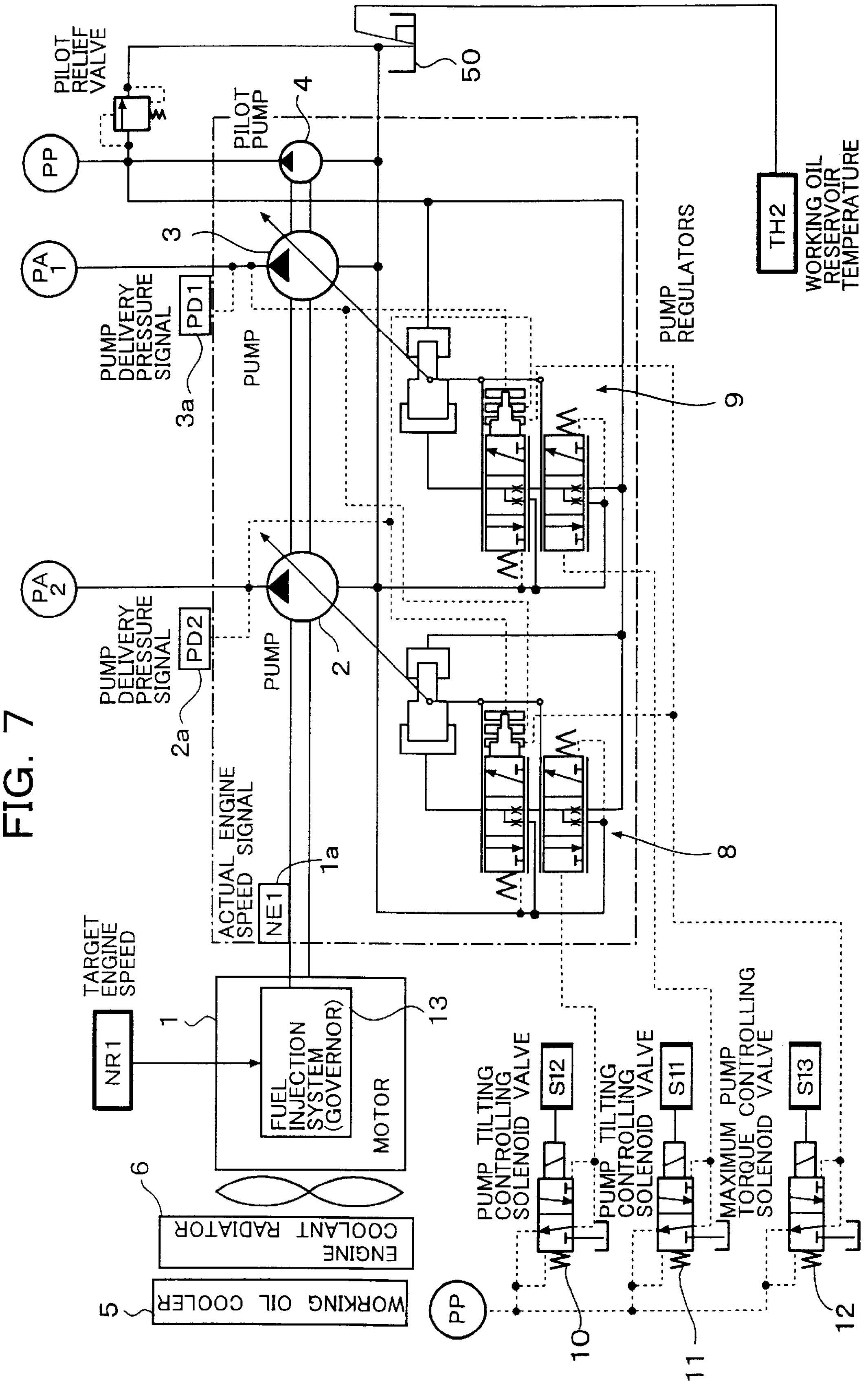
FIG. 7 is a diagram showing a drive mechanism of a construction machine equipped with a second embodiment of the present invention.
Figure 8:
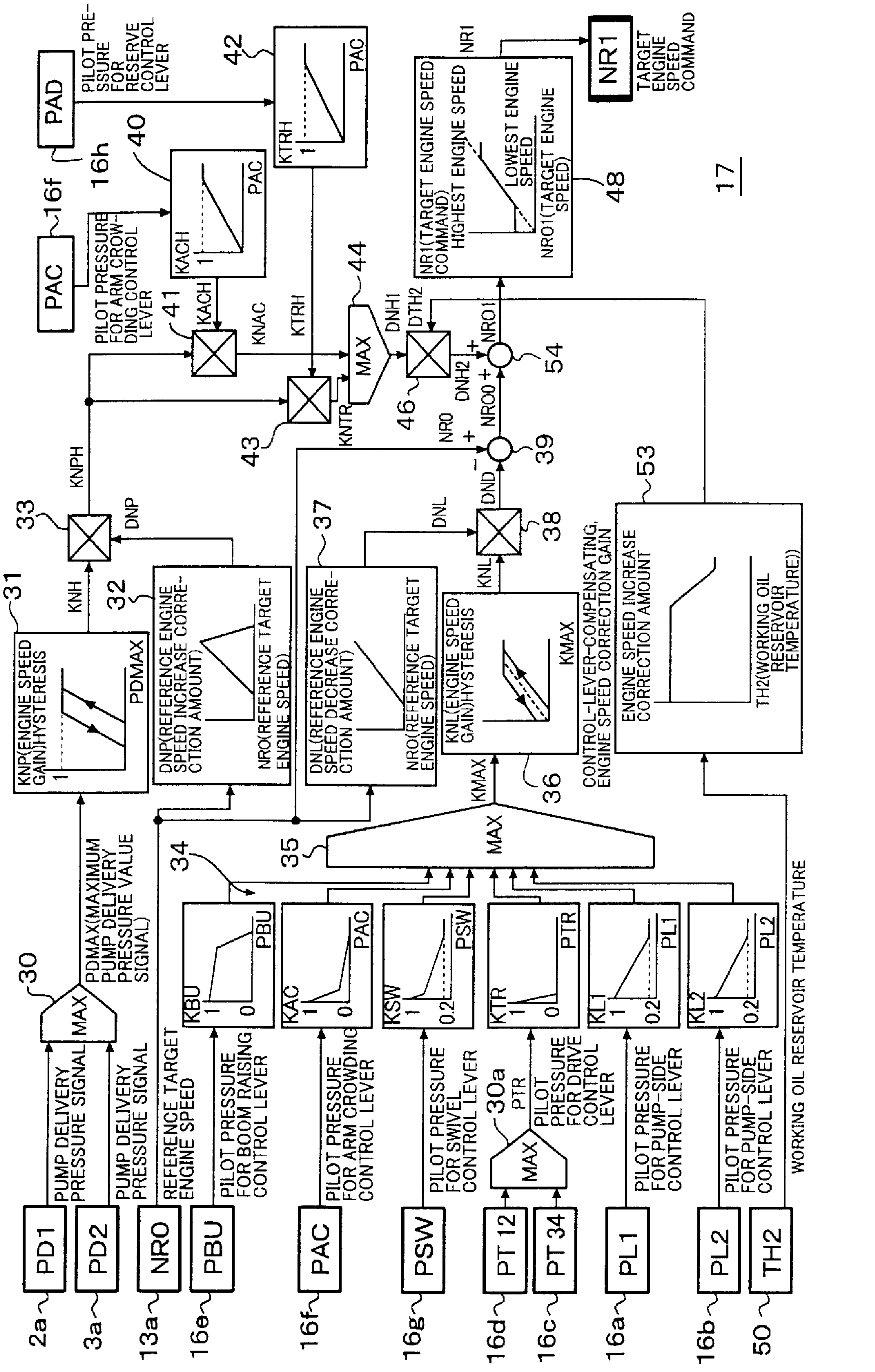
FIG. 8 is a diagram illustrating an engine speed control means, which includes a first correction value computing means and a fourth correction value computing means, and a fifth correction value computing means and a second engine speed computing means both of which are included in a second correction means, all of which are arranged in a controller constituting the second embodiment of the present invention.
Figure 9:
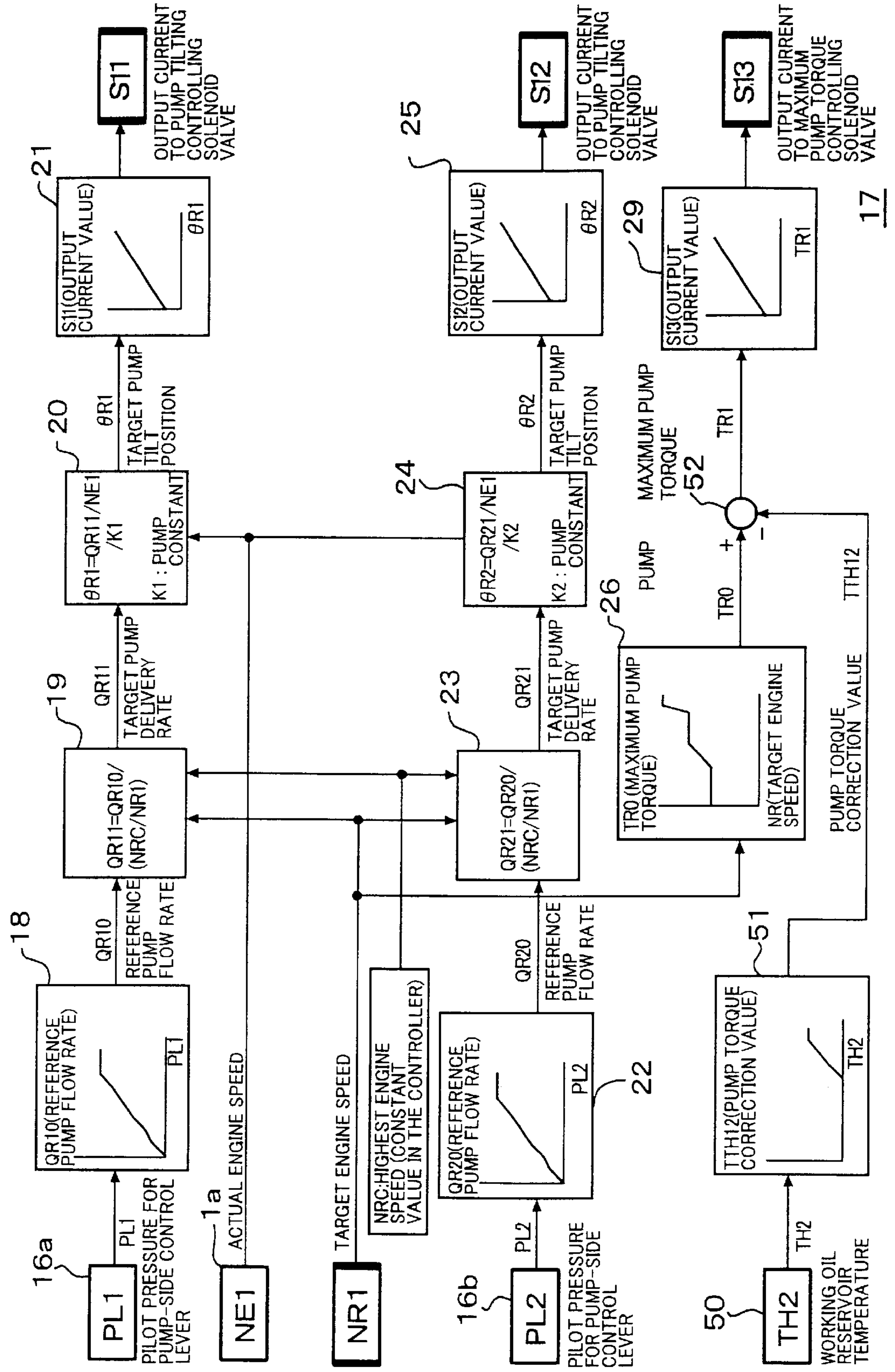
FIG. 9 is a diagram depicting a pump absorption torque control means, and a sixth correction value computing means and a second torque computing means both of which are included in the second correction means, all of which are arranged in the controller constituting the second embodiment of the present invention.

FIG. 7 is the diagram showing the drive mechanism of the construction machine equipped with the second embodiment of the present invention; FIG. 8 is the diagram illustrating the engine speed control means, which includes the first correction value computing means and the fourth correction value computing means, and the fifth correction value computing means and the second engine speed computing means both of which are included in the second correction means, all of which are arranged in the controller constituting the second embodiment of the present invention, and FIG. 9 is the diagram depicting the pump absorption torque control means, and the sixth correction value computing means and the second torque computing means both of which are included in the second correction means, all of which are arranged in the controller constituting the second embodiment of the present invention.

Similar to the above-described first embodiment, this second embodiment is also arranged, for example, on a hydraulic excavator. As illustrated in FIG. 7, this second embodiment is particularly provided at a reservoir thereof with a working oil temperature detector 50 for detecting the temperature of working oil flowing through a circuit and outputting a working oil reservoir temperature signal TH2.

As illustrated in FIG. 8, there is also provided a fifth correction value computing means 53 for determining a fifth correction value DTH2, which corrects the extent of an increase in the corrected target engine speed, on the basis of the working oil reservoir temperature signal TH2 detected by the working oil temperature detector 50, in accordance with a functional relation preset with a view to avoiding overheating of the engine 1. As illustrated in FIG. 8, the fifth correction value computing means 53 outputs a constant value as the fifth correction value DTH2 until the working oil reservoir temperature reaches a predetermined temperature, and as the working oil reservoir temperature rises beyond the predetermined temperature, outputs as the fifth correction value DTH2 a value which becomes gradually smaller.

Arranged further are a multiplier 46 for multiplying together the signal DNH1 outputted from the maximum value selecting means 44 and the fifth correction value DTH2 outputted from the maximum value selecting means 44 and outputting a signal DNH2, and an adder 54 for performing an arithmetic operation such that the signal DNH2 outputted from the amplifier 46 and the NROO outputted from a subtracter 39 are added together to obtain a signal NRO1. This adder 54 constitutes the second engine speed computing means for determining a new target engine speed on the basis of the fifth correction value DTH2 outputted from the fifth correction value computing means 53 and the above-described corrected target engine speed computed by the engine speed control means.

As depicted in FIG. 9, there are also arranged a sixth correction value computing means51 for determining a sixth correction value TTH12, which corrects a target maximum pump absorption value TRO outputted from a pump absorption torque control means 26 outputted from a pump absorption torque control means 26, in accordance with a functional relation preset with a view to avoiding overheating of the engine 1, and a subtracter 52 for subtracting the sixth correction value TTH12 from the above-described target maximum pump absorption torque value TRO. This subtracter 52 constitutes the second torque computing means which determines a new target maximum pump absorption torque TR1 on the basis of the sixth correction value TTH12 and the target maximum pump absorption torque value TRO.

The remaining construction is designed, for example, to be equivalent to the above-described first embodiment.

The above-described elements of structure, that is, the fifth correction value computing means 53 and the adder 54 making up the second engine speed computing means, both of which are shown in FIG. 8, and the sixth correction value computing means 51 and the subtracter 52 making up the second torque computing means, both of which are illustrated in FIG. 9, constitute the second correction means which corrects the above-described corrected target engine speed determined by the engine speed control means and the target maximum pump absorption torque value TRO computed by the pump absorption control means 26 into a new target engine speed NROL and a new target maximum pump absorption torque TR1, respectively, in accordance with the working oil reservoir temperature signal TH2 detected at the working oil temperature detector 50.

In the second embodiment constituted as described above, substantially the same operation as in the above-described first embodiment is performed based on the working oil temperature.

Described specifically, now assume that work during which high loads are applied is performed for a short time, the working oil temperature does not rise substantially, and accordingly, the working oil reservoir temperature signal TH2 detected at the working oil reservoir temperature detector 50 does not become substantially high. An engine speed increase correction amount which is a constant value, namely, a fifth correction value DTH2 is selected at the fifth correction value computing means 53 and is inputted to the multiplier 46. At the multiplier 46, DNH1 and the fifth correction value DTH2 are multiplied together, and the thus-obtained DNH2 is inputted to the adder 54. At the adder 54, a corrected target engine speed NROO and DNH2 are added together, and the thus-obtained NRO1 is outputted. This NRO1 is a value which is not subjected to any correction in accordance with a working oil temperature. A relatively high target engine speed NR1 corresponding to NRO1 is determined at the computing means 48, and this target engine speed NR1 is outputted to the fuel injection system 13 shown in FIG. 1. In addition, the target engine speed NR1 is also used for controlling the delivery rates and maximum absorption torques of the pumps.

The fuel injection system 13 drives the engine 1 to obtain an engine speed commensurate with the target engine speed NR1. An actual engine speed NE1 of the engine 1 is detected at the actual engine speed detector 1*a*.

As the high-load work has been performed for the short time and the working oil temperature has not risen substantially, for example, the sixth correction value TTH12 determined at the sixth correction value computing means 51 shown in FIG. 9 is "0", and this "0" is inputted to the subtracter 52. A signal TR1 equal in value to the target maximum pump absorption torque value TRO is, therefore, outputted from the subtracter 52. An output current value signal S13 corresponding to this TR1 is outputted from the computing means 29, and is fed to the solenoid operated valve 12 shown in FIG. 1. As a result, the solenoid operated valve 12 is driven to perform overall power control such that the total maximum absorption torque of the hydraulic pumps 2,3 depicted in FIG. 1 does not exceed the output torque of the engine 1.

When, for example, the stroke of the control lever for the boom, said control lever being shown in FIG. 3, is rendered smaller in such a state as described above, the value of the first correction value KBU corresponding to the signal PBU from the first correction value computing means 34 shown in FIG. 8 becomes greater, and as a result, the value of the corrected target engine speed NROO outputted from the subtracter 39 becomes smaller so that the target engine speed NR1 outputted from the computing means 48 becomes lower compared with the existing target engine speed. As a consequence, the maximum pump absorption torque TRO determined at the pump absorption torque control means 26 illustrated in FIG. 9 also becomes smaller than the existing target maximum pump absorption torque value.

When, for example, work during which high loads are applied is performed for a short time and the working oil temperature does not rise substantially, the second embodiment can also achieve an improvement in the efficiency of work by making the target engine speed NR1 higher and the target maximum pump absorption torque value TRO(TR1) greater as in the above-described first embodiment. When from the above-described situation, the stroke of the control lever becomes smaller and the load becomes lower, for example, the target engine speed NR1 becomes lower and the target maximum pump absorption torque value TRO (TR1) becomes smaller, thereby making it possible to achieve a saving in energy.

When, for example, the reference target engine speed NRO is set high and high-load work is performed for a long time or the temperature of the working environment becomes higher and as a result, the working oil temperature rises, on the other hand, the fifth correction value DTH2 determined at the fifth correction value computing means 53 shown in FIG. 8 becomes smaller than the existing fifth correction value, and as a consequence, the value of the signal DNH2 outputted from the multiplier 46 becomes smaller so that the value of the target engine speed NRO1 determined at the adder 54 also becomes smaller. Namely, the corrected target engine speed NROO (NRO1) is corrected such that it becomes smaller than the existing value, and accordingly, a further corrected, new target engine speed NRO1 is obtained.

As a consequence, the target engine speed NR1 outputted from the computing means 48 also becomes lower, and by the fuel injection system 13 depicted in FIG. 1, the actual engine speed NE1 is lowered to an engine speed within a range in which no overheating takes place.

As a result of the reduction in the target engine speed NR1 as mentioned above, the target maximum pump absorption torque value TRO outputted from the pump absorption torque control means 26 becomes smaller, the value of the sixth correction value TTH12 determined at the sixth correction value computing means 51 shown in FIG. 9 becomes greater, and the value of TR1 determined at the subtracter 52 becomes smaller. Therefore, the output current value signal

S13 determined at the computing means 29 becomes a smaller value. As a consequence, the regulator 12 controls such that the total maximum absorption torque of the hydraulic pumps 2,3 becomes smaller than the existing total maximum absorption torque.

According to the second embodiment constructed as described above, it is also possible to achieve a saving in energy and an improvement in the efficiency of work and also to avoid overheating and thus, discontinuation of work due to overheating.

INDUSTRIAL APPLICABILITY

According to the present invention, it is possible to achieve a saving in energy and an improvement in the efficiency of work as in the conventional art, and further, to surely avoid overheating, which has not been taken into consideration in the conventional art, and hence to avoid discontinuation of work due to overheating.

What is claimed is:

1. A control system for a construction machine provided with an engine, a variable displacement hydraulic pump driven by said engine, a pump regulator for controlling a delivery rate of said hydraulic pump, a fuel injection system for said engine, hydraulic actuators driven by pressure oil delivered from said hydraulic pump, flow control valves for controlling flows of pressure oil to be supplied from said hydraulic pump to said hydraulic actuators, and control devices for controlling said flow control valves, said control system being provided with a controller including an engine speed control means for correcting a reference target engine speed, which is inputted by an operator, in accordance with a controlled amount of at least one of said control devices to obtain a corrected target engine speed and a pump absorption torque control means for determining a target maximum pump absorption torque value corresponding to said corrected target engine speed, wherein:

said control system is provided with a working oil temperature detector; and said controller comprises a second correcting means for correcting said corrected target engine speed, which has been obtained by said engine speed control means, and said target maximum pump absorption torque value, which has been computed by said pump absorption torque control means, into a new target engine speed and a new target maximum pump absorption torque, respectively, in accordance with a working oil temperature detected by said working oil temperature detector.

2. A control system according to claim 1, wherein:

said engine speed control means comprises a first correction value computing means for correcting said reference target engine speed in accordance with types of said hydraulic actuators and a computing means for determining said corrected target engine speed in accordance with said first correction value and said reference target engine speed; and said second correcting means comprises a fifth correction value computing means for determining a fifth correction value, which corrects said corrected target engine speed in accordance with a preset functional relation, based on said working oil temperature detected by said working oil temperature detector, a second engine speed computing means for determining a new target engine speed in accordance with said fifth correction value and said corrected target engine speed, a sixth correction value computing means for determining a sixth correction value, which corrects said target maximum pump absorption torque value in accordance with a preset functional relation, based on said working oil temperature detected by said working oil temperature detector, and a second torque computing means for determining a new target maximum pump absorption torque in accordance with said sixth correction value and said target maximum pump absorption torque value.

3. A control system according to claim 2, wherein:

said engine speed control means comprises a fourth correction value computing means for determining a fourth correction value, which corrects said reference target engine speed, in accordance with operating directions of said hydraulic actuators; and said second engine speed computing means for determining a still new target engine speed in accordance with said fourth correction value and said new target engine speed.

4. A control system according to any one of claims 1–3, wherein said construction machine is a hydraulic excavator.

* * * * *